United States Patent
Bryan et al.

(10) Patent No.: US 8,493,510 B2
(45) Date of Patent: Jul. 23, 2013

(54) METHOD AND APPARATUS FOR CONCEALING PORTIONS OF A VIDEO SCREEN

(75) Inventors: David Alan Bryan, Carmel, NY (US); Nicol So, Newton, PA (US)

(73) Assignee: Time Warner Inc., New York, NY (US)

( * ) Notice: Subject to any disclaimer, the term of this patent is extended or adjusted under 35 U.S.C. 154(b) by 1254 days.

(21) Appl. No.: 11/637,310

(22) Filed: Dec. 12, 2006

(65) Prior Publication Data

US 2008/0138030 A1    Jun. 12, 2008

(51) Int. Cl.
*H04N 7/00* (2011.01)
*H04N 11/00* (2006.01)
*H04N 5/76* (2006.01)

(52) U.S. Cl.
USPC ............ 348/564; 725/25; 725/32; 725/34; 725/29; 386/248; 386/254; 386/255

(58) Field of Classification Search
USPC ............ 348/564, 553, 552, 725; 725/25, 725/32, 34; 386/249, 248, 239
See application file for complete search history.

(56) References Cited

U.S. PATENT DOCUMENTS

| | | | | |
|---|---|---|---|---|
| 4,420,769 A * | 12/1983 | Novak | ............... | 348/180 |
| 4,750,213 A * | 6/1988 | Novak | ............... | 455/3.01 |
| 5,151,788 A * | 9/1992 | Blum | ............... | 348/725 |
| 5,973,723 A * | 10/1999 | DeLuca | ............... | 725/34 |
| 5,999,689 A * | 12/1999 | Iggulden | ............... | 386/248 |
| 7,269,330 B1 * | 9/2007 | Iggulden | ............... | 386/248 |
| 7,690,011 B2 * | 3/2010 | Lienhart et al. | ............... | 725/25 |
| 7,694,318 B2 * | 4/2010 | Konig et al. | ............... | 725/32 |
| 7,738,704 B2 * | 6/2010 | Lienhart et al. | ............... | 382/181 |
| 2005/0094032 A1 | 5/2005 | Rogitz | | |
| 2008/0109657 A1 * | 5/2008 | Bajaj et al. | ............... | 713/168 |

OTHER PUBLICATIONS

Yan et al., "Erasing Video Logos Based on Image Inpainting", School of Computing, National University of Singapore, Singapore, 2002 IEEE.

* cited by examiner

*Primary Examiner* — Paulos M Natnael

(74) *Attorney, Agent, or Firm* — Gottlieb, Rackman & Reisman, P.C.

(57) ABSTRACT

A simple, cost-effective, and robust method and system to obstruct crawls, logos, and other annoying and distracting images overlaid on a video signal and displayed on a TV set or monitor is provided. The method and system may detect the presence of the unwanted images and block them automatically, or they may accept manual input from the user via a handheld control device to block or obstruct these images.

6 Claims, 9 Drawing Sheets

METHOD AND APPARATUS FOR CONCEALING PORTIONS OF A VIDEO SCREEN

RELATED APPLICATIONS

None

BACKGROUND OF THE INVENTION

A. Field of the Invention

This invention relates to a method and system for selectively replacing portions of a displayed video screen. More particularly a system and method are provided in which extraneous or undesirable image elements on a screen are blocked or replaced with more acceptable image elements.

B. Description of the Prior Art

TV channels, especially network channels, have lately taken to overlaying various "additions" or "enhancements" onto a main video screen. A particularly annoying (to some people) example is "the crawl", which is a horizontal stream of text that is overlaid on top of an image and generally moves from right to left across the bottom of a screen. Other examples of potentially annoying extraneous image elements include pop-ups that advertise upcoming shows, sports-related "scoreboards" and "state", and logos added for branding purposes.

Other extraneous image elements include an extra border surrounding the main screen. On at least some TV sets it is not possible to remove this border from the screen, even using TV viewing modes such as zoom mode. Moreover, in most instances, even if the zoom mode removes most of an extraneous image element, some portions thereof, usually disposed along the sides and/or the top of the screen remain visible. While this may be good branding for the broadcaster or distributor of programs, it is quite distracting to the viewer, especially when the extraneous image elements are very bright or have a light color and viewing scenes provide dark backgrounds.

The extraneous image elements may, at one time or another, be perceived as distracting and/or annoying by almost all the viewers. In fact, one of the present inventors has observed a TV viewer construct a crude manual solution to this problem: a piece of heavy paper taped over the bottom portion of a TV screen to cover up a "crawl" because it was too intrusive.

Thus, a need exists for selectively removing or replacing extraneous image elements from a video screen. The removed elements can be replaced with less visually annoying and distracting elements.

Although there have been attempts or claims to solve this problem, there is no concrete, definitive solution. In U.S. patent application Ser. No. 10/696,141 (Publication US 2005/0094032), the inventor proposes "to prevent the hideously scrolling ticker from being presented to the viewer". The viewer accomplishes this "simply by manipulating a button on a remote control" to "suppress [the] scrolling part from view".

Another attempt to eliminate the annoying and distracting overlays is detailed in a paper entitled "Erasing Video Logos Based on Image Inpainting" (Proc. IEEE International Conference on Multimedia and Expo, Lausanne, August 2002). The authors of the paper describe methods of detecting video logos and "inpainting" (filling in of any gaps in photographs) the picture areas from which they are removed. The paper describes manually selecting the rough rectangular region of the video clip that encloses the logo. Then the color frames of the selected region are transformed into grey-scale frames, and the contrast in the grey-scale video is enhanced. The best-quality logo frame is also obtained from the video clip. After the logo is obtained, the region with logo is restored by the image "inpainting" technique (i.e., the logos are erased from the video frames). However, the method described in the paper employs an algorithm, which, although less complicated than those published previously, is still compute-intensive. For the goal of replacing a logo, crawl, or other offending video with less offensive video, the method and system of the present invention provide a simpler and more cost effective solution.

SUMMARY OF THE INVENTION

The present invention meets the current need for a superior means to obstruct or remove the annoying and distracting image elements of a broadcast program.

The invention uses a simple, inexpensive and robust method and system to cover up, or more appropriately, replace undesirable image elements. The present invention could be provided as a premium service, possibly a paid service from cable companies, satellite companies or other broadcast content providers to enable any given subscriber to eliminate crawls or logos on a screen. These undesirable image elements are replaced by blocks having suitable sizes and colors. In one embodiment, the sizes and colors of the blocks are either preselected or customized by the viewer and the colors are preselected, or selected by the viewer from a pallet. In another embodiment, the colors of the blocks are dynamically changed to match features of a current image thereby making the blocks less visible.

BRIEF DESCRIPTION OF THE DRAWINGS

The features and advantages of the present invention will become further understood with reference to the following description, appended claims and accompanying drawings, in which:

DETAILED DESCRIPTION OF THE PREFERRED EMBODIMENTS

Figure 1:
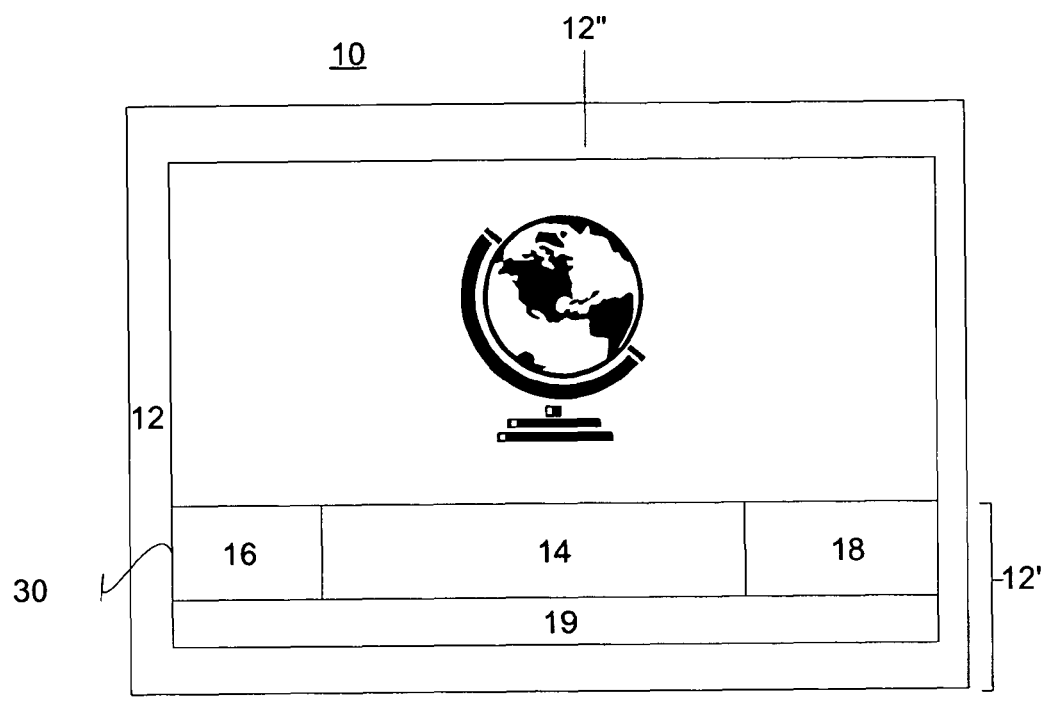
FIG. 1 is an illustration of a video media player in a so-called "full screen mode" with an undesirable border around the perimeter of the screen.

In one preferred embodiment, the invention allows the viewer (and/or others, e.g. potentially, a service provider) to replace certain portions of a displayed broadcast program in a static manner. The term "broadcast program" is used herein to include any content from a service provider that is distributed to many viewers, said content including some image elements that may be undesirable or objectionable to at least some of the viewers. The broadcast program can be distributed over the airways as standard TV signals, over cable connections, satellite transmissions, Internet streaming and other similar means. FIG. 1 provides an illustration of a typical broadcast program with undesirable image elements. In this example, generated by AOL's Hi-Q Video Player, the display 10 is provided with a border 12. The border 12 contains a bottom segment including an advertising link 14, a running time bar 16, and a "Compact Size" button 18, and other control buttons 19 all of which may be undesirable. The top segment may include a title bar and other information or active controls. In addition, the border 12 itself is white color, which may annoy some viewers because the border may be much brighter than the picture content. The present invention allows the viewer to block or replace the border and the unnecessary extra features or image elements of the border 12, as described in more detail below.

Figure 2A:
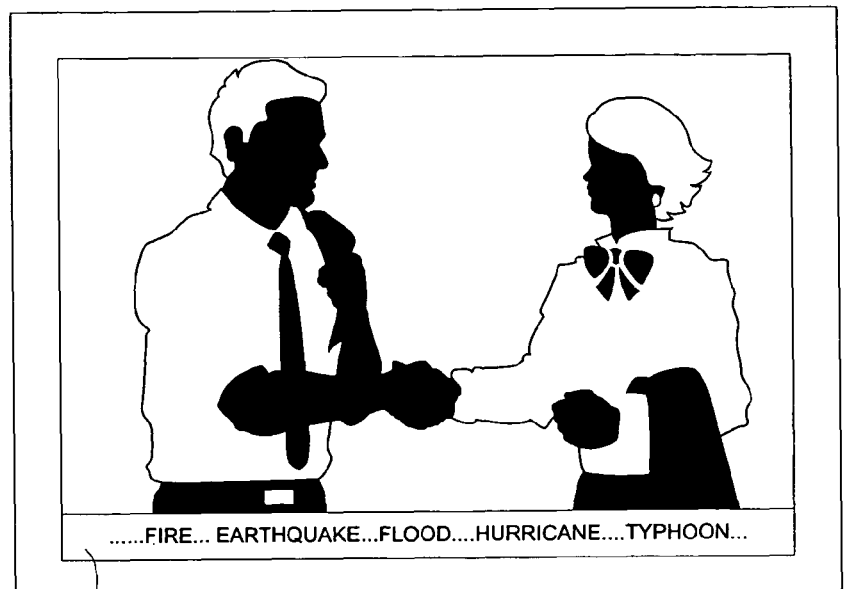
FIG. 2a is an illustration of a typical video screen with a text crawl at the bottom of the screen.
Figure 2B:
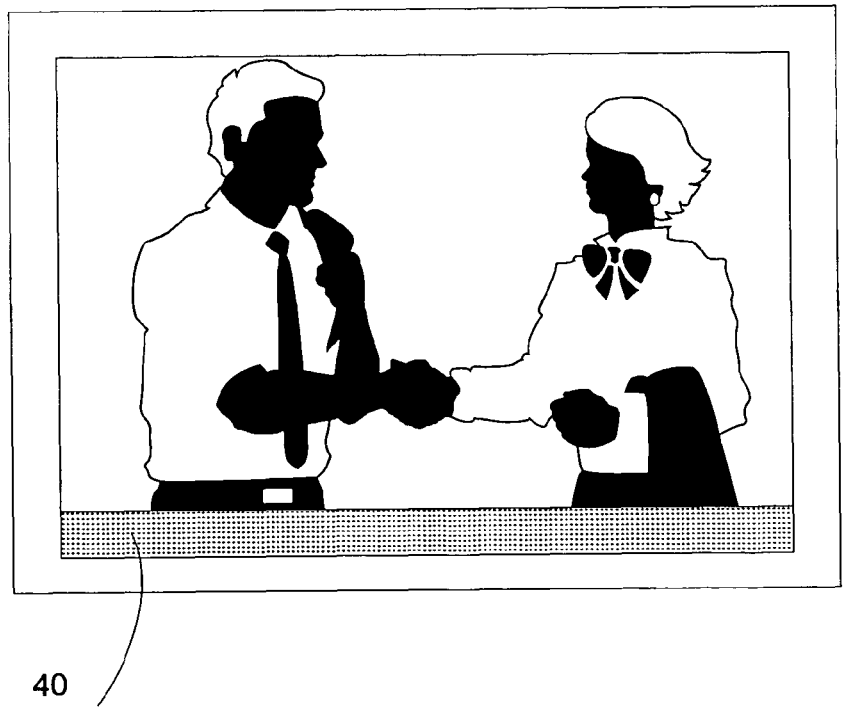
FIG. 2b is an illustration of the typical video screen of FIG. 2a with the crawl at the bottom of the screen blocked out.

FIG. 2a illustrates a broadcast program with a crawl 20. The program can be displayed on a TV screen or PC monitor with the crawl 20 being disposed at the bottom of screen as shown and normally consisting of streaming text. As illustrated in FIG. 2b, in the present invention the undesirable image element (e.g., the crawl 20) is replaced by a static black bar or block 40 at least while the crawl is present. In one example of this embodiment, a viewer can simply push a single "lock crawl" button on a remote control (discussed more fully below) resulting in a black bar 40. The term "Remote control" in the context of this invention shall mean any wired or wireless device, preferably a handheld device, which has the ability to control the system implementing the present invention. The crawl height and location tend to be approximately the same for all channels therefore this embodiment can be implemented using the same black block overlaid on the bottom of the TV screen for all the channels.

Figure 6:
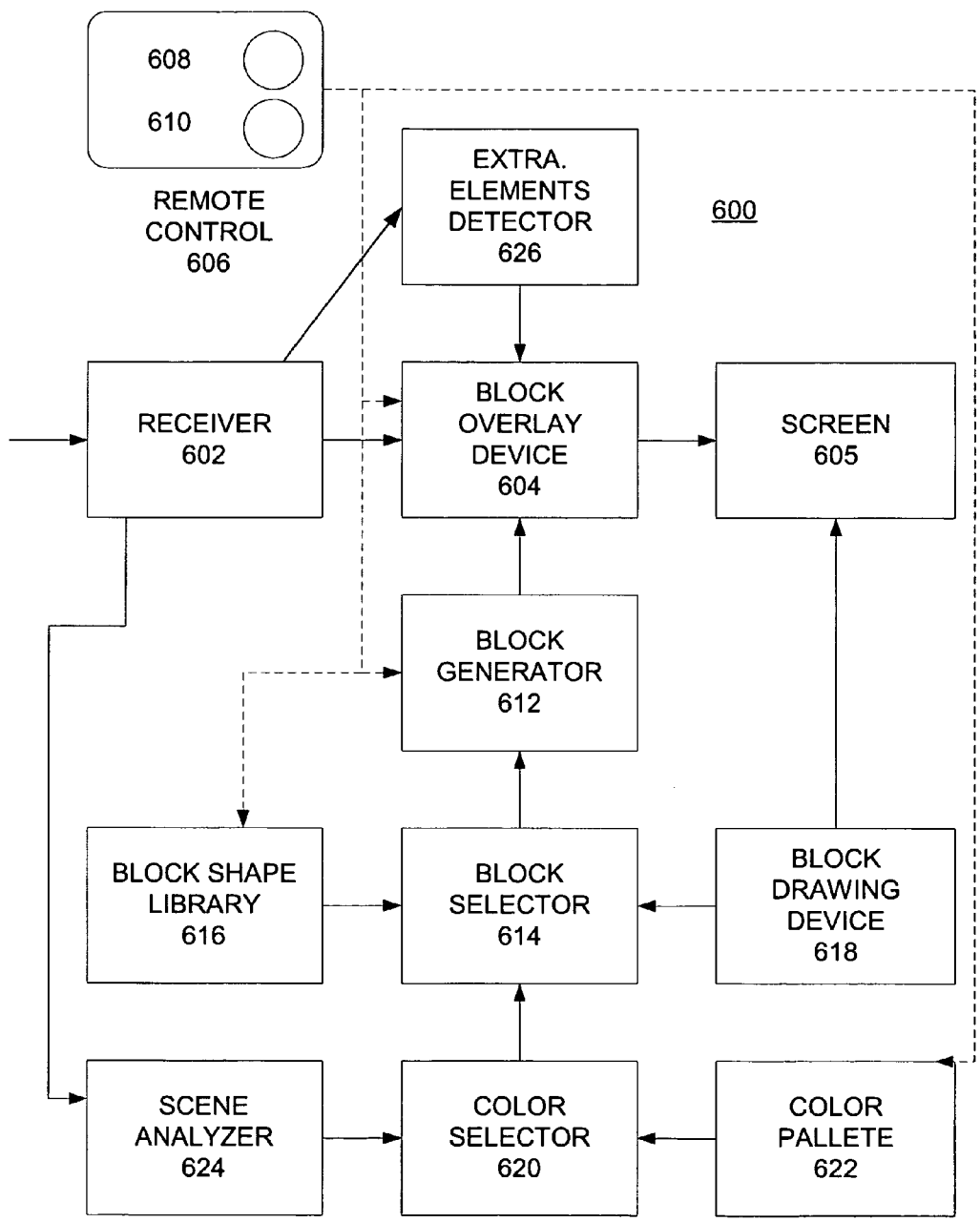
FIG. 6 shows a block diagram constructed in accordance with the present invention to implement the embodiments shown in the Figures above.

FIG. 6 shows an apparatus for implementing the invention. In this figure, a receiver 602 receives a broadcast program and feeds it to a block overlay device 604. The output of the device 604 is then fed to a screen 605 for display to one or more viewers. The operation of the apparatus, including the device 604 is responsive to commands from a remote control 606. The elements shown in FIG. 6 (with the possible exception of the remote control 606) may all be incorporated into a TV set or a set top box or other similar devices. Alternatively, parts of the apparatus 600 may be provided as a separate standalone system in its own housing (not shown). For example all of the parts of the apparatus 600 except 602, 605, 608 and 610 may be provided as a standalone system that, e.g., accepts a "video out" signal output (not shown) from part 602 of a TV set comprising parts 602 and 605, and returns processed video via a "video in" input (not shown) to TV set part 605. Such a standalone system may also accept commands from remote control parts 608 and 610, where the remote control may control both the TV set and the standalone system. Alternatively, all of the parts of the apparatus except 602, 605, 608, and 610 may be provided as a standalone system that, e.g., accepts an "RF in" signal from a set top box (STB), demodulates the RF signal to baseband, processes the baseband video signal, remodulates the baseband signal to RF, and provides an "RF out" signal to a TV set comprising parts 602 and 605.

For the embodiment of FIGS. 2a, 2b, a user can selectively activate or deactivate the block overlay device 604 by using remote control 606. For example, the remote control 606 may have a pushbutton 608 to control device 604. When device 604 is deactivated, the images from receiver 602 are passed through to screen 606, and include the extraneous crawl 20. When the device 604 is activated, the block overlay device generates a black block 40 that is overlaid on top of the images from 602 resulting in the images, such as the one in FIG. 2b.

In a somewhat more sophisticated example of this embodiment, the remote control 606 may feature two buttons 608, 610 for providing a "block crawl" and a "round corners" function respectively. This may produce a relatively pleasing "rounded off" TV picture that can eliminate such features as logos, sports scoreboards, and even "picture outside picture" ads that are sometimes used during events that have no acceptable interruption points, such as soccer games. These concepts are demonstrated in FIGS. 3a and 3b.

Figure 3A:
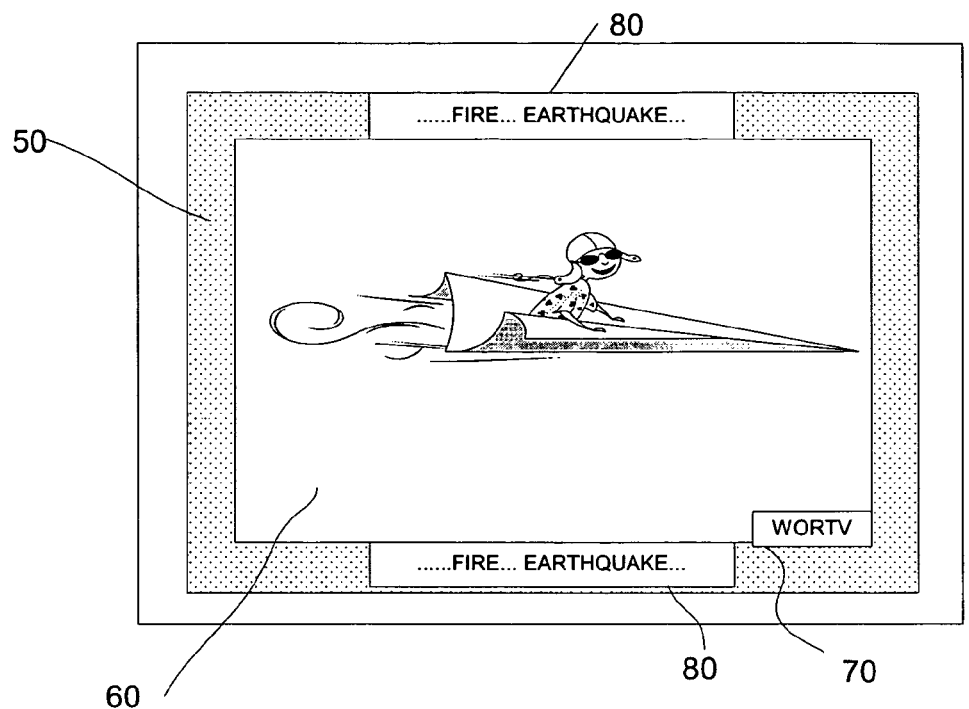
FIG. 3a is an illustration of a typical video screen with a border and a logo around the outer portion of the screen.

FIG. 3a illustrates a video monitor or TV screen with a border around the video image, and a logo in the lower right corner of the video image. The border 30 includes several image elements including side segments 50 disposed around the main screen area 60, at least one corner element 70 with a logo or other information and two segments 80 disposed at the top and the bottom of the screen.

Figure 3B:
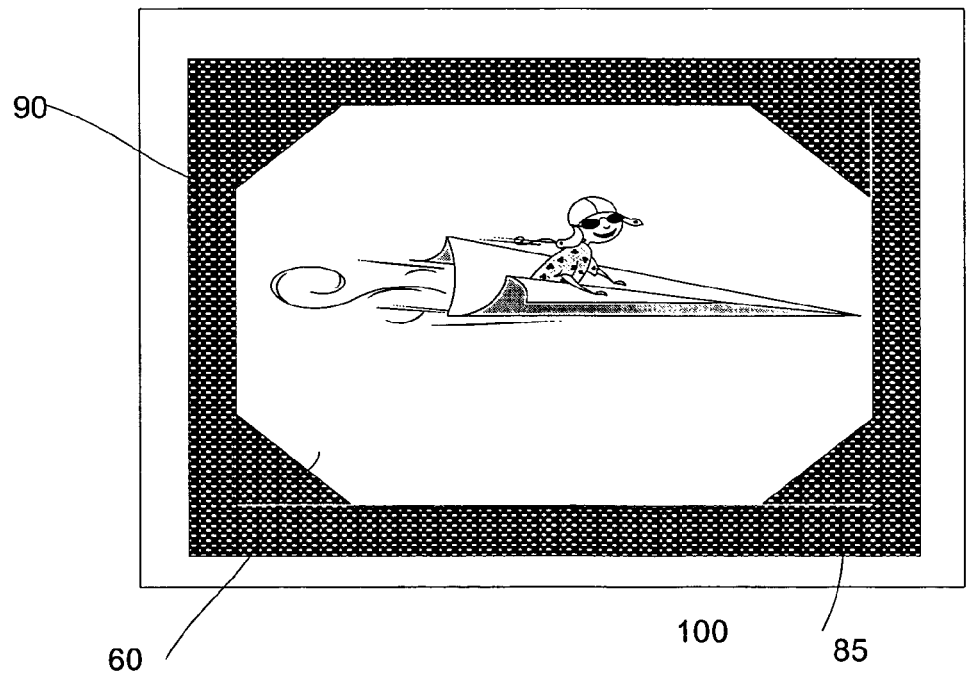
FIG. 3b is an illustration of the typical video screen of FIG. 3a with the border and logo blocked by "rounding off" corners.

According to the present invention, the recited image elements are replaced by blocks forming a black frame 90. The frame 90 is generated in response to the activation of the first button 608 on the remote control 606. In addition, the corner elements 70 are replaced by black corner blocks 85 when the corner (or rounded off) button 610 is activated on the remote 606, thereby replacing the corners of the image. In one embodiment shown in FIG. 3b, the corners 85 are triangular. In an alternate embodiment, the hypotenuses of the triangles are replaced with curved edges (not shown). FIG. 3b illustrates the images that are generated by the block overlay device 604 with a black border that is used with the rounded corners, or corners replaced by triangular-shaped black portions, to replace the logo and the annoying and distracting border segments.

The viewer can select the less-obtrusive method of rounding off the corners based on the viewer's preference (i.e., using a curved-line, triangular or other standard or custom shapes pleasing to the viewer). Again, in this example, a default-sized, rounded off picture may prove acceptable given that TV broadcasters have a fairly good understanding of how much of the picture they can overlay without generating excessive hostility from viewers (i.e., the maximum sizes of items that are overlaid on the corners of images can be predicted with a high degree of certainty)

In another embodiment, the viewer is provided with a more sophisticated user interface that allows him or her to replace arbitrarily sized and shaped picture regions. For example, the user interface may allow the viewer to replace, with black-colored rectangles, one to four (or more) arbitrarily-sized rectangular picture regions on each side of the TV picture. In this example, the viewer is provided with the ability to black out certain characters or scenery at any of the top, bottom, left or right side of a TV picture if it is not to the viewer's liking for any reason, and not just to remove logos, crawls and other unnecessary overlays. The viewer may simply want to black out a certain character or background on one side of a TV picture, for example, and this embodiment gives the viewer this ability. Thus, with reference to FIG. 3a, the viewer may select two rectangular black bars to replace top and bottom border segments and a black rectangle to replace the logo. The black bars are of a pre-selected size, and a number of blocks of different sizes may be made available to the viewer. In another embodiment of the invention, the viewer is given the capability of resizing the black bars as necessary to accommodate the size of the broadcast picture element that the viewer wants to replace.

These concepts may be implemented as follows. Referring to FIG. 6, the device 600 includes a block generator 612, a block selector 614 and a block shape library 616. Either at the beginning, or during the presentation of the broadcast program, the remote control 606 is used by a viewer to select one or more blocks through block selector 614. The block selector 614 selects the blocks from a block library 616. For example, the library 616 stores blocks of several different shapes, including horizontal bars, vertical bars that can be placed along the edges of an image, as well as triangles or other shapes suitable for the corners. The sizes of the block shapes may be fixed, or the viewer may change their sizes before they are fed to the block selector 614. The block selector 614 then sends the characteristics of the blocks to the block generator 612 provides the block(s) to device 604 for superposition or overlay onto the image.

In another embodiment of the invention, the user interface supports drawing on the TV screen 605 with the remote control 606 or another input device, so that the viewer can select one of many preset shapes from library 616, draw an arbitrary shape, or resize the selected or drawn shape as required. The block is then superimposed on the screen 605 by the block drawing device 618. The viewer can also move the block to any desired position on the screen 605 with device 618. Once the viewer is satisfied with the size, shape and position of the block, he requests this information to be loaded into the block selector 614 for transmitting to device 604.

In the embodiments described above, the undesirable or extraneous image elements are replaced with black blocks of various shapes and sizes. In another embodiment of the invention, instead of black blocks, the image elements from a broadcast program are replaced with blocks of one or more sizes and one or more colors selected from an arbitrary palette (i.e., the replacement blocks are "filled" with any color selected from the palette provided to the viewer). More particularly, device 600 is optionally provided with a color selector 620. The viewer can then designated one or more colors for the blocks (e.g., white, green, blue, etc.). These colors may be generic colors. Alternatively, an electronic color palette 622 maybe provided and the viewer can select any color from the palette 622 for the blocks.

In yet another embodiment, the subject invention provides means for automatically determining a color for one or more blocks based on the colors of the image from the broadcast program. For example, the means may be used to determine a predominant color (and/or texture) of the image close to the image element being replaced. This predominant color and/or texture is then used for the optical attributes of the respective replacement blocks.

Figure 4A:
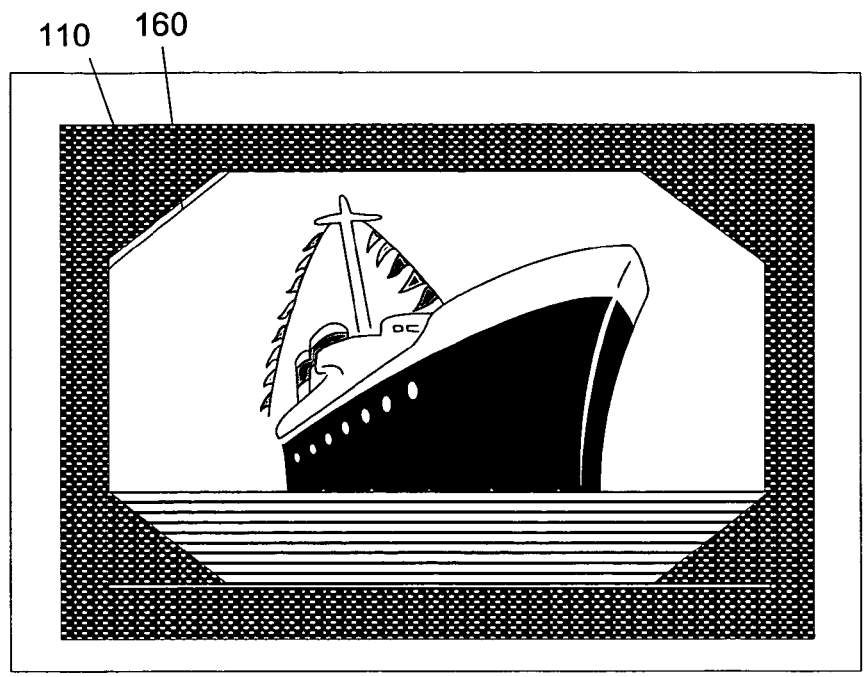
FIG. 4a is an illustration of a typical video screen with underlying borders and/or logos blacked out.
Figure 4B:
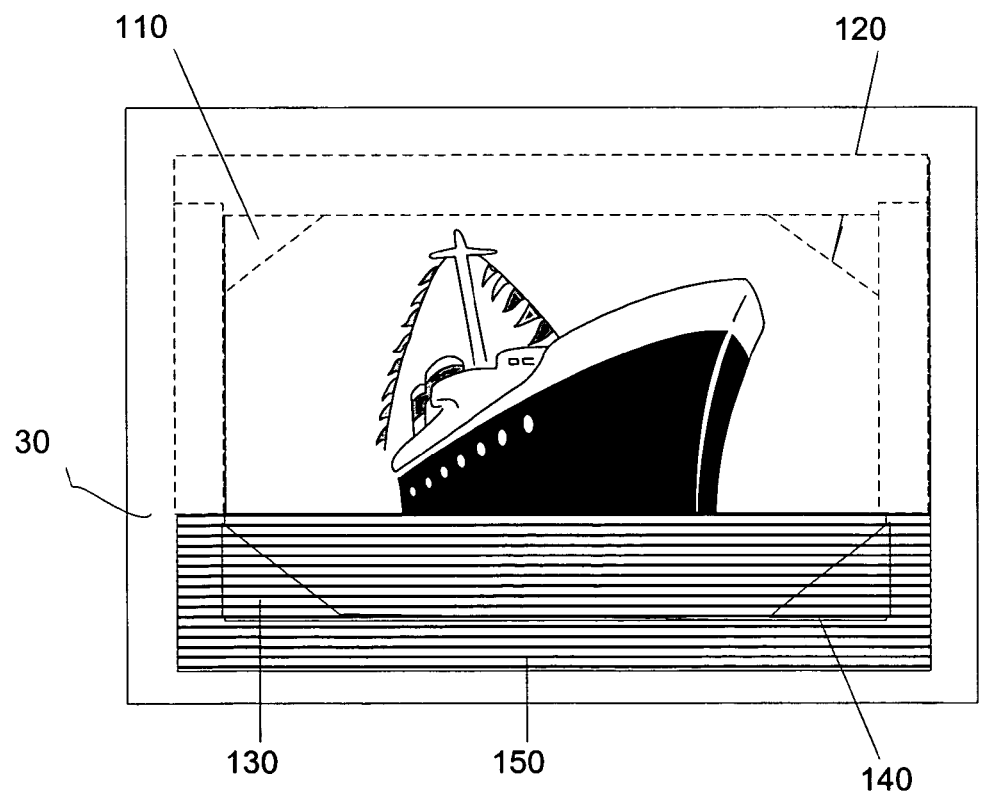
FIG. 4b is an illustration of the typical video screen of FIG. 4a where the underlying borders and/or logos are obscured by overlaying them with different image elements having colors similar to the adjoining portions of the broadcast image.

Alternatively the means determines what constitutes the predominant background color/texture of the to-be-replaced region by determining, for example, the color of video within that region that is closest to the color of video surrounding (outside) that region, and thereby setting the color of the to-be-replaced region to the color within the region that is closest to that of the surrounding video. FIG. 4b illustrates that the picture regions of the video or TV screen that may be otherwise blacked out with a rounded-corner and a border configuration (see FIG. 4a) can instead be filled with the closest color from the surrounding regions. For example, in the image shown in FIG. 4b the ship is surrounded with light blue sky and riding in dark blue water. Therefore the upper portion of the frame and the two corner blocks or triangles are light blue, because the predominant color nearest to (but outside of) the picture area to be filled in is light blue. Similarly the lower portion of the frame and the corner triangles or blocks are colored dark blue matching the water. If the picture contains other elements with different colors at or near the borders, the borders and the corner blocks are colored accordingly. The "nearby" picture region from which the predominant fill color is determined may be selected, for example, as a strip of the picture bordering the to be filled in region of the picture. For example in FIG. 4a, a diagonal strip 160 of the picture adjoining the hypotenuse of the triangular region 110 may be examined, from which it may be determined that the predominant color in that diagonal strip is white; white may then be used to fill in region 110. The size of such a nearby bordering picture area may be determined based upon experience; for example a relatively narrow region (e.g., 160) whose length is equal to the length of the adjoining to be filled in region (e.g., 110) may be selected.

The predominant color of a region of an image can be detected by counting the number of pixels in the region with particular pixel values. The value of a pixel in a color picture can be represented as three parameters r, g, b representing the red, green, and blue brightness of the pixel respectively. The region can, for example, be a rectangular region defined by the coordinates of its lower-left corner and by its width and height. To determine if a given region in a picture consists substantially of pixels of only one color, the pixels in the region are tallied based on their pixel values, as illustrated in the flow chart of FIG. 7. The region is assumed to have its lower left corner at coordinates x and y, with a width of i pixels and a height of j pixels. The process is initialized in steps 702-714. In step 716 the parameter values (that is the parameters r,g,b) of a given pixel are obtained. In performing this computation, it may be desirable to reduce the number of distinct colors recognized so that colors that are very similar will be counted in the same tally. This can be achieved by reducing non-overlapping ranges of color to "standard" color values. This can be thought of as a form of quantization and can be achieved in many ways. One exemplary way is to reduce the precision of each RGB component values to 4 bits, from an initially higher precision. This step is performed in step 718. In steps 720-724 a new pixel is selected and the process is repeated.

After tallying (step 710), the (preferably quantized) pixel value with the highest tally is identified in step 726. Steps 728-734 are not executed in this case, namely, the case of identifying the predominant color of the adjoining picture region.

Figure 5A:
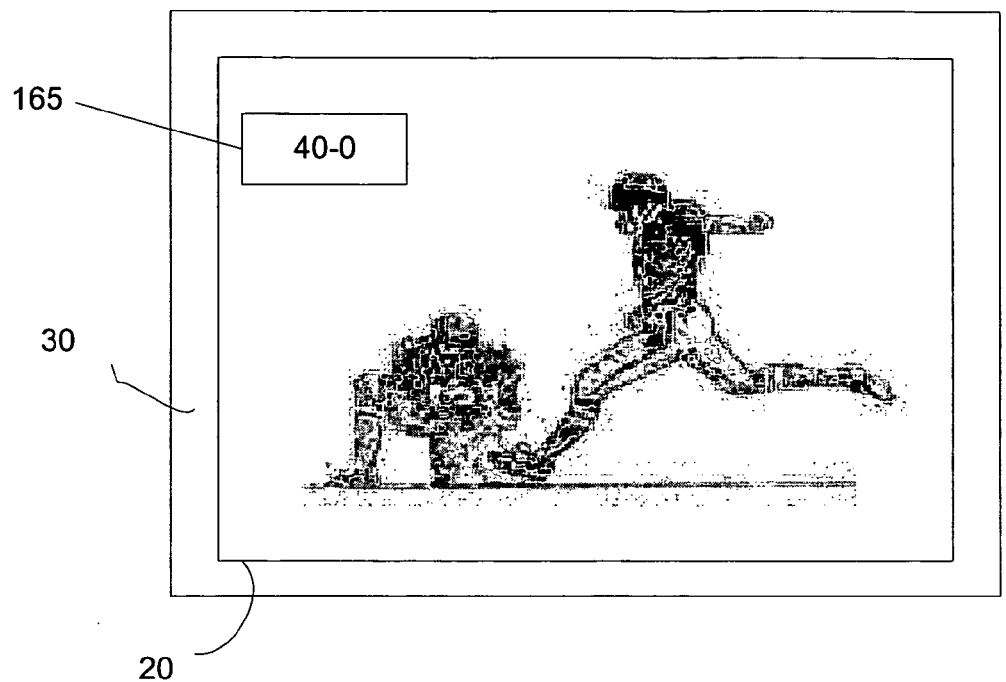
FIG. 5a is an illustration of a typical video screen with a scoreboard at the top left corner of the screen.
Figure 5B:
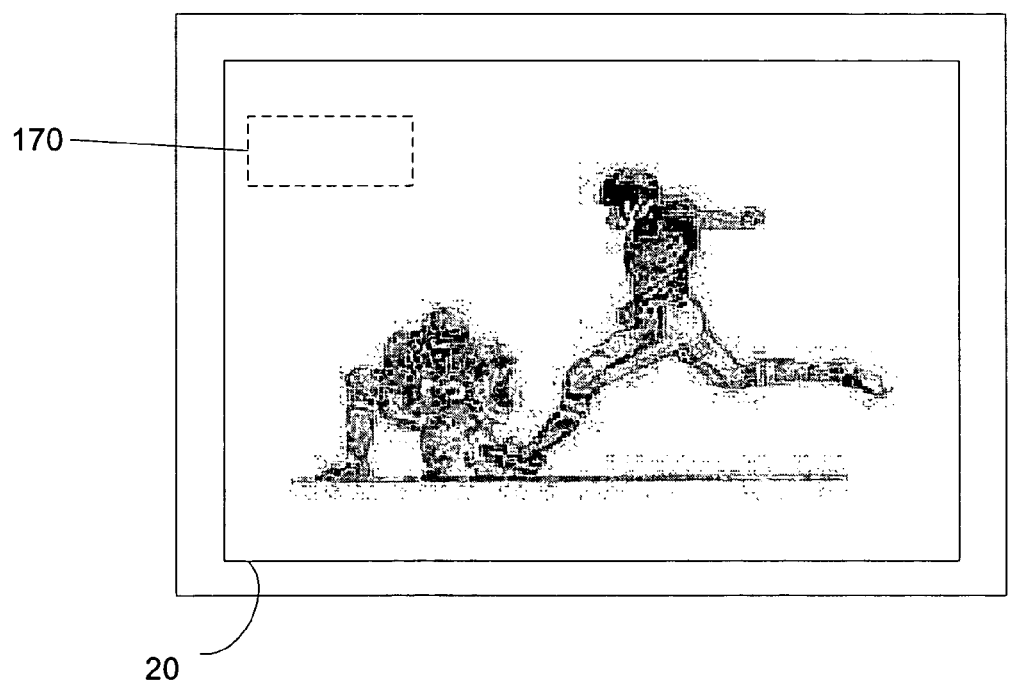
FIG. 5b is an illustration of the typical video screen of FIG. 5a with the scoreboard blocked by a video of a similar color to the video image.

FIGS. 5a and 5b illustrate another example of replacing a portion of a broadcast program where the football scoreboard is placed near the upper left corner of the image in a block 160. In the present invention, the block 165 is replaced with a block 170 having similar dimensions, said block 170 being filled with a sky-blue video signal to match the sky above the heads of the players as shown in FIG. 5b. As the game progresses, and the scenes are changed by the director, the color of block 170 is changed accordingly In order to implement the embodiments of FIGS. 4a, 4b, 5a, 5b, the apparatus 600 includes a scene analyzer 624. The scene analyzer 624 determines what automatically what color should the blocks be based on one or more of the strategies, and then feeds this information into the color selector 620.

In general, various strategies may be used to chose the color of the replacement blocks. In one embodiment, the system controlling the display device may be able to "copy" the video nearest (e.g., immediately adjacent) the to-be-replaced region into the to-be replaced region. For example, the video on each TV signal line nearest to the to-be-replaced video may be copied into the to-be-replaced portion of each TV signal line. In this example, there may be some video on TV resolution lines incoming to the display device that is near the horizontal blanking pulses and is available for copying and free of objectionable additions. In some cases, this may be video that is not normally displayed on the screen. This determination is made by the scene analyzer 624.

In yet other embodiments, the device 600 may replace blocks of video pixels by copying blocks that are known to be in the same position on the display before and/or after the to-be replaced blocks. For example, by examining MPEG motion vectors, the device may determine that certain blocks of pixels will later move into the to-be-replaced region, and use those blocks of pixels within that region instead of the pixels that represent the crawl or other distraction. Since MPEG motion vectors may also predict motion retrospectively, the display device may also determine that certain blocks of pixels would have emerged from the to-be-replaced region on the display into their current positions. These blocks of pixels may then be copied and used to replace the to-be-replaced pixels. If both forward (prospective) and backward (retrospective) motion vectors are available, the display device may replace pixels with pixels representing the average of the pixels of the blocks predicted to lead to and result from blocks that would have been displayed except for being obscured by some distracting video. Note that this particular approach may not succeed if, for example, the motion is only linear in the horizontal direction, and the obscuring distraction is a horizontal crawl bar.

In yet further embodiments, a "zoom and shift" function may be employed to drive the crawl and/or other distractions off the screen. Today's TV sets may have a zoom function, but typically this does not result in driving all added distractions off the screen, i.e., usually some portions of the top, bottom, or the sides of the original (non-zoomed) picture are still visible and may still be distracting. A "shift" function (using a button or buttons on the remote control 606), may cause the zoomed video to also be shifted up, down, left, and/or right as required to drive the distracting portion of the zoomed video off the screen. While the objective of driving all distractions off the screen might be achieved with one high zoom setting alone, that causes only the central portion of the original video picture to be visible. Thus, the side portions of the original video are zoomed off the screen unnecessarily if only one zoom setting capable of driving all possible distractions on all picture areas off screen is available. Therefore, the "zoom and shift" function may be preferred by the viewers since this function contributes less to video loss. How to implement a zoom function is well known to those skilled in the art, as evidenced by its availability in TV sets currently on the market. Shifting the picture position left or right and/or up or down on the screen may be accomplished by implementing a variable delay between the video signal and the associated horizontal and/or vertical synchronization (sync) pulses. The incoming video signal may be analyzed by e.g., block overlay device 604 and the embedded sync pulses removed. New sync pulses may be inserted into the video signal that are delayed or advanced with respect to the position of the removed sync pulses to cause a shift in the position of the video on the screen. Note that this process may result in black picture areas at the picture borders if the shift is sufficiently large because the portion of the picture that was at or near the removed sync pulses (which is black) may become visible. In some embodiments, these black areas may be filled in with adjoining colors in the manner described above.

In some embodiments, heuristics may be used to automatically detect the presence of a scrolling text display on screen. Such heuristics need not work perfectly to be of substantial utility and may be based on any or a combination of a variety of characteristics commonly associated with a scrolling text display. Examples of such characteristics include the presence of a rectangular area near the top or the bottom of the screen, which consists mostly of a foreground color and a background color, or, in embodiments in which motion-compensated video compression is employed, the presence of a rectangular area near the top or the bottom of the screen in which the motion vectors of pixel blocks in the area have substantially the same value and point in substantially the same direction and such a condition persists for at least a predefined period of time (two seconds for example). The identification can also be done by recognizing that the video displayed with a constant motion in one direction overlaid onto a video signal near the bottom edge of the displayed image is the unwanted crawl if it includes alpha-numeric characters. The system can also receive information in the video stream itself that indicates which portions of the stream belong to the video portion and which belong to the crawl.

Motion search or motion estimation techniques known in the art can be employed to estimate motion in the portion of the screen in which the presence of a scrolling text area is to be determined. This technique can be implemented regardless of whether or not the video coding employs motion compensation.

In some embodiments, techniques may be employed to automatically detect a logo. Logos (a.k.a. digital on-screen graphics or "bugs") are often implemented in one of two ways: as (1) a constant opaque graphic overlay, or (2) as a constant semi-transparent overlay superimposed on video.

In the first case, the presence of a constant opaque graphic overlay may be detected by detecting blocks of pixels whose values remain substantially unchanged over a threshold amount of time in a location where bugs are likely to be found. Preferably, the threshold is chosen to be long enough to reduce the probability of false positive, yet short enough to permit acceptably faster detection.

In the second case, the presence of a semi-transparent overlay may be detected as an area whose picture values never fall below certain predetermined threshold over a period of time. During dark scenes or scene changes, when most of the screen is black or dark (i.e. below a predefined threshold), any blocks of "bright" pixels (with brightness above a predefined threshold) can be presumed to be part of a logo. The detected possible presence of a logo can be combined with pixel value statistics over time to arrive at a determination that a logo is indeed present.

In some embodiments, automatic logo detection may be limited to certain portions of the screen. For example, the system may apply logo detection only to the borders of the picture, or only to a subset of the border (e.g., the lower right corner where logos are often applied by broadcasters).

Figure 7:
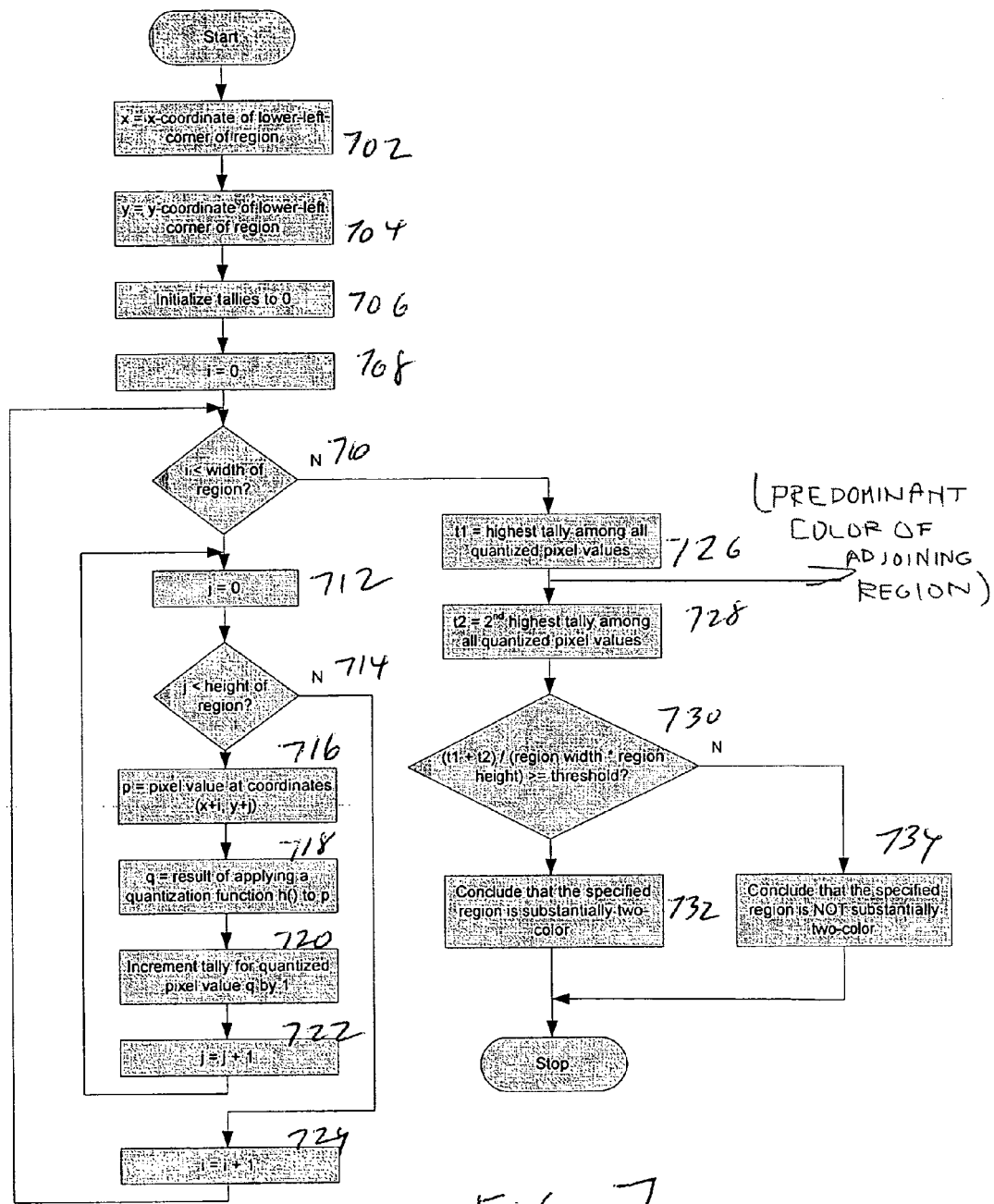
FIG. 7 shows a flow chart for a method of identifying the predominant color of a region and/or identifying a region of a video screen as a two-color region.

One process of detecting a scrolling text display is now described in conjunction with the flow chart of FIG. 7. A substantially two-color region in an image can be detected by counting the number of pixels in the region with particular pixel values. To determine if a given region in a picture consists substantially of pixels of only two colors, the pixels in the region are tallied based on their pixel values, as illustrated in the flow chart of FIG. 7. The region is assumed to have its lower left corner at coordinates x and y, with a width of i pixels and a height of j pixels. The process is initialized in steps 702-714. In step 716 the parameter values (that is the parameters r,g,b) of a given pixel are obtained. In performing this computation, it may be desirable to reduce the number of distinct colors recognized so that colors that are very similar will be counted in the same tally. This can be achieved by reducing non-overlapping ranges of color to "standard" color values. This can be thought of as a form of quantization and can be achieved in many ways. One exemplary way is to reduce the precision of each RGB component values to 4 bits, from an initially higher precision. This step is performed in step 718. In steps 720-724 a new pixel is selected and the process is repeated.

After tallying (step 710), the (preferably quantized) pixel values with the two highest tallies are identified. If the sum of the two highest tallies exceeds a predetermined percentage (e.g. 90%) of the pixels in the given region, the region is determined to be substantially of two colors (steps 726-734).

Another process of detecting a scrolling text display is now described. It is well known that a video sequence consists of a sequence of pictures called frames, each of which is a rectangular array of pixels. Here we adopt the convention that coordinates (0, 0) is at the lower-left corner of the frame. The coordinates of a pixel can be thought of as a position vector, represented as a single symbol notation-wise.

As discussed above, typically In a color picture, the value of a pixel can be represented, for example, as three parameters r, g and b representing the red, green, and blue brightness values of the pixel respectively. Just like the position of a pixel, the value of a pixel can be represented as a single symbol notation-wise.

In the description that follows, a "block" is a rectangular block of pixel within a frame. For simplicity of exposition, we assume that only one predefined block size is used, so that there is no need to specify the dimensions of a block. As an example, MPEG-2 uses a block size of 16×16 pixels for the purpose of motion compensation.

The position of a block can be represented by the position of its lower-left corner.

Let $pv_1=(r_1, g_1, b_1)$ and $pv_2=(r_2, g_2, b_2)$ be two pixel values, a metric can be defined to measure the "distance" between $pv_1$ and $pv_2$. The expression $|pv_1-pv_2|$ represents one such a distance measure defined in terms of a "vector norm" function ($|\cdot|$). Examples of such vector norm include the standard vector norms. The L-norm of an n-dimensional vector $a=(a_1, a_2, \ldots, a_n)$ is given by the formula $|a|_L=(|a_1|^L+\ldots+|a_n|^L)^{1/L}$.

Two exemplary vector norms are the 1-norm and the 2-norm. The 1-norm of a vector (r, g, b) is the sum $|r|+|g|+|b|$. The 2-norm of a vector (r, g, b) is the value $(r^2+g^2+b^2)^{1/2}$. Other metric functions for vectors are known.

From a norm function defined on single pixel values, we can define a similar function $|\cdot|$ on arrays of pixel values. Let $A=[a_{i,j}]$ be an array of pixel values. $|A|$ is defined as $$|A| = \sqrt[M]{\sum_{i,j} |a_{i,j}|^M},$$

where $|a_{i,j}|$ is the result of applying a suitable norm function (as explained before) on the pixel value $a_{i,j}$, and M is a non-negative real number. Exemplary values of M include 1 and 2.

Let A and B be arrays representing two blocks of pixel values. $|A-B|$ provides a measure of how close A & B are. In particular, if A=B, $|A-B|=0$.

For the rest of this exposition on motion estimation, we denote by A a block at position p in the current frame, and B a block at location (p-d) in the previous frame. The motion vector for block A is a value of d that satisfies some (approximate) minimization criterion. Depending on the (approximate) minimization criterion used and other implementation details, different implementations of motion estimation may not yield identical motion vectors, although it is expected that they are identical or very close most of the time.

The search for the motion vector for a block A is performed in a neighborhood ("search area") around A. Such a neighborhood can be defined in terms of maximum (Euclidean) displacement, maximum horizontal and/or vertical displacement. Other ways of defining such an area are possible.

In some embodiments, the x- and y-components of candidate motion vectors are limited to integer values. In other embodiments, half-values between successive integer values are also allowed. It is possible to increase the granularity of allowable x- and y-component values of candidate motion vectors even further.

When fractional values are allowed in the x- and y-components of a candidate motion vector, it may be necessary to perform interpolation when forming block B at position p-d in the previous frame. Methods for interpolating pixels, such as linear and cubic interpolations, are known.

The estimation of motion vector can be performed in many ways. In some embodiments, the motion vector d is chosen from the allowable values within the search area so as to minimize $|A-B|$. In other embodiments, the motion vector is chosen to reduce $|A-B|$ to below a predetermined threshold.

The search for motion vector can be performed in many ways. A straightforward method is to examine all candidate motion vectors in the search area for a value of d that minimizes $|A-B|$. Another approach is to use hill-climbing to obtain a sequence of displacement vectors that successively better minimize $|A-B|$.

If a video sequence contains a region of scrolling content, most of the motion vectors of the blocks in the region will point to the direction of scrolling. Moreover, most of the motion vectors will have (near-) identical magnitudes (reflecting uniform motion in the region). Video sequences may occasionally have short periods of uniform motion in a region of the frame, even when the region does not generally contain scrolling content. To reduce the occurrences of falsely detecting a scrolling region, a time threshold can be employed so that a determination of probable scrolling region is made only after condition(s) associated with a scrolling region persist for some time, say 5 seconds or more.

Any of the conditions below can be treated as indicative of a region with scrolling content:

1. The fraction of blocks in the region with motion vectors pointing in substantially the same direction is $\geq$ a predetermined threshold, for example 85%.

2. The fraction of blocks in a region with substantially the same motion vector (in terms of both direction and magnitude) is $\geq$ a predetermined threshold, for example 85%.

In the case of a news ticker (a.k.a. a "newsticker" or, in TV jargon,"the crawl") occurring at or near the bottom of a television screen, we may additionally require the motion vectors to point to the left. News tickers on different TV channels tend to scroll at a limited range of speed. By further requiring the magnitudes of the motion vectors to fall within a range typical of news tickers, occurrences of false positive detection can be further reduced.

Figure 8:
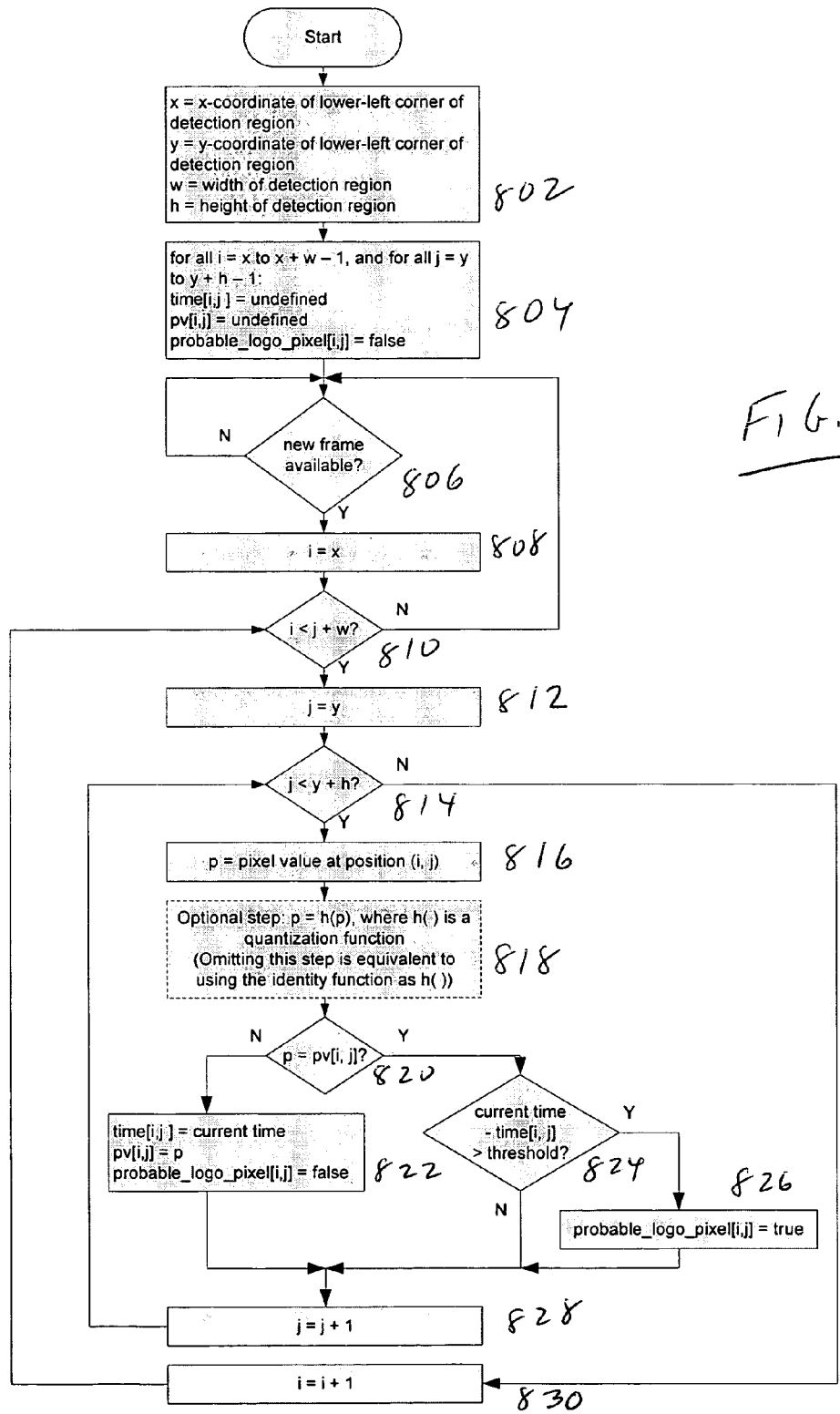
FIG. 8 shows a flow chart for a method of detecting the presence of an opaque logo in a video.

One process of detecting an opaque logo is now described in conjunction with the flow chart of FIG. 8. The presence of a constant opaque overlay may be detected by detecting the presence of pixels, in a location where bugs are likely to be found, whose values remain substantially unchanged over a threshold amount of time. Preferably, the time threshold is chosen to be long enough to reduce the probability of false positive yet short enough to permit reasonably fast detection.

In this exemplary embodiment, the detection region is defined by the coordinates of its lower-left corner, and a width and a height parameter. A 2-dimensional array probable_logo$_{13}$ pixel[] stores a flag for each pixel in the region indicating whether the (quantized) value of the pixel has remain unchanged for a threshold amount of time. The elements of probable_logo_pixel[] is continually updated—its content is refreshed each time a new video frame is available.

In the exemplary embodiment, an optional quantization function is employed to provide some "noise immunity" i.e. tolerance for (small) fluctuations (over time) in the values of probable logo pixels, which may cause false negatives in logo detection. Quantization functions are known in the art. This is only an example method of providing tolerance for small, insignificant fluctuations in pixel values. Other known methods for the purpose can be substituted.

The exemplary embodiment detects, at an individual pixel level, whether a pixel is part of a probable logo. If the goal of detection is to detect if a probable logo is present, the determination can be made by counting the number of probable logo pixels in the detection region. If the count is non-zero (or alternatively, above a predefined threshold), a determination of probable presence of a logo is made.

The process is initialized in steps 802-814. In step 816 the parameter p of a current pixel is determined. In step 818 the value of p is optionally quantized. In step 820 the parameter p is compared to the value pv (l,j) and then used to determine whether the pixel associated with p likely represents a logo pixel (steps 824, 826) or not (Step 822). In steps 828, 830 the next pixel is selected.

Figure 9:
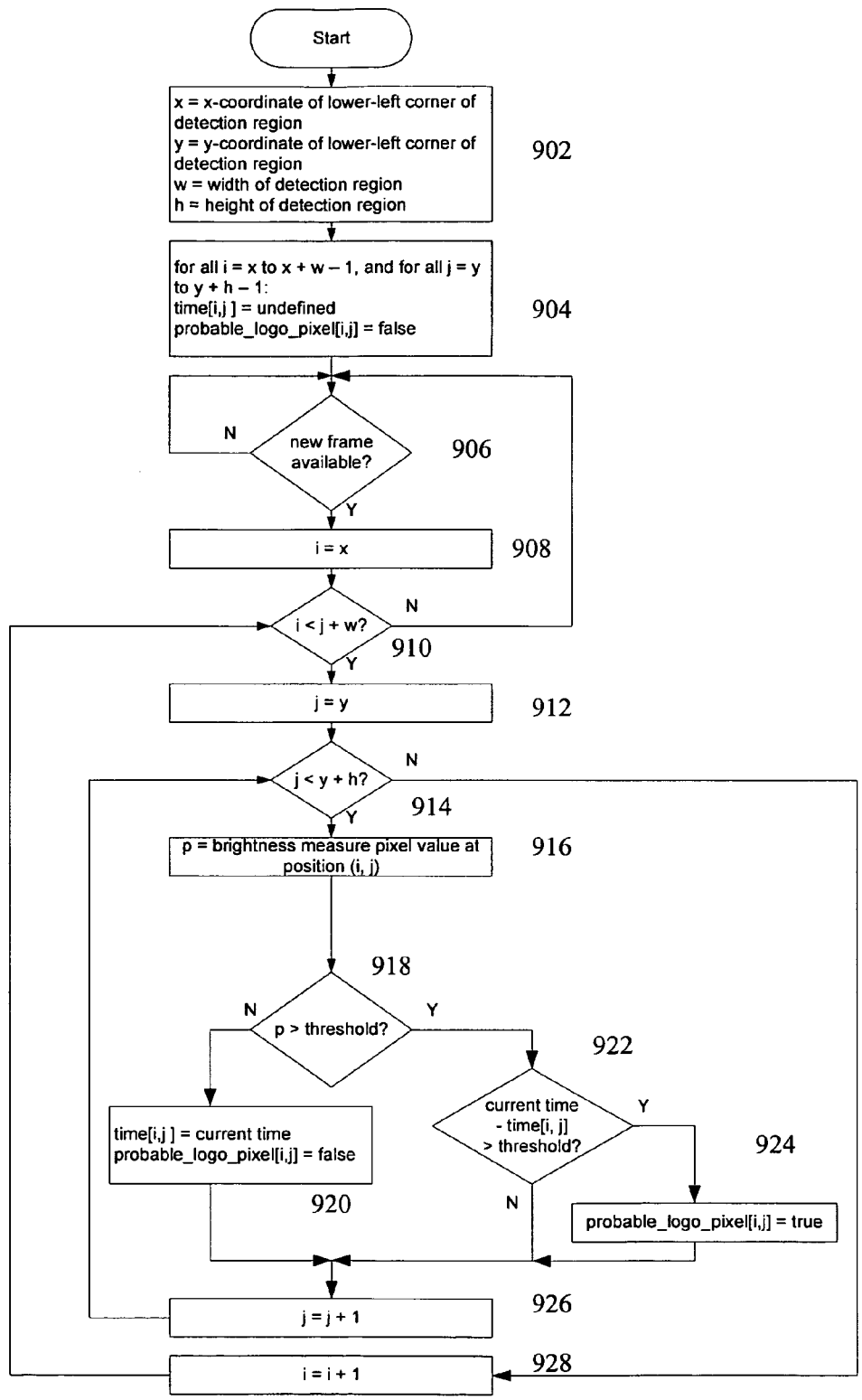
FIG. 9 shows a flow chart for a method of detecting the presence of a semi-transparent logo in a video.

One process of detecting a semi-transparent logo is now described in conjunction with the flow chart of FIG. 9. What follows is an adaptation of the previous exemplary embodiment. This adapted embodiment detects the probable presence of a semi-transparent logo (or overlay) by detecting pixels whose brightness value (calculated according to some brightness measure) does not fall below a predefined threshold, and has remained so for at least a certain threshold amount of time. The process is initialized in steps 902-914. In step 916 the parameter p of a current pixel is determined. The parameter p is compared to a threshold and then used to determine whether the pixel associated with p likely represents a logo pixel (steps 922, 924) or not (step 920). In steps 926, 928 the next pixel is selected.

The heuristics described in the above, and variations thereof, can be combined with other heuristics to improve the accuracy of detection.

In other embodiments, the system may use learning algorithms to detect logos. To facilitate the robustness of the learning, the system and/or viewer may specify that the learning algorithm should only be applied to a certain region of the picture (i.e., the lower right corner where logos are often applied by broadcasters).

In many embodiments, the system may memorize the region of the picture to blacken, fill in, or otherwise replace with more pleasing pixels on a per-channel and/or per-program basis. For example, if the system detects or the viewer specifies that a particular logo generally appears in the lower right corner of a certain channel, the system may save a description of the region to be replaced each time that channel is tuned. For even finer functionality, the system may memorize the region to be replaced on a per-program basis to account for the case where logos or other distractions appear at different regions of the video picture in different programs on the same channel. For example, even though the only distraction on the local Fox channel may be a small logo in the lower-right corner of the picture, an annoying scoreboard may appear in the upper-left corner of the picture during football games on that channel. In this case, the system may memorize that certain regions in both the lower-right and upper-left regions of the picture should be replaced during the football telecasts. The system may, for example, keep track of which programs to replace using a table stored in its non-volatile memory, shown in the table below.

| Channel | Program | Region to be Replaced |
| --- | --- | --- |
| 2 (CBS) | Survivor | Horizontal pixel X1 to X2; vertical pixel Y1 to Y2 (lower right logo region). |
| 5 (Fox) | Football | Horizontal pixel X3 to X4; vertical pixel Y3 to Y4 (lower right logo region). |
| 5 (Fox) | Football | Horizontal pixel X5 to X6; vertical pixel Y5 to Y6 (upper left scoreboard region). |
| . | . | . |
| . | . | . |
| . | . | . |
| 32 (CNN) | (All) | Horizontal pixel X7 to X8; vertical pixel Y7 to Y8 (bottom crawl region). |

The above table is only an example. Other variations are possible the region to be replaced may be specified by time offsets (i.e., so many nanoseconds offset from horizontal/vertical sync pulse edges in the case of analog video signals), rather than by pixel numbers.

In some embodiments, the above-described replacement of annoying video may be overridden by closed-captioning and/or emergency notification video displayed on top of the replaced video. The option to override replacement video may be selectable by the viewer, although preferably the option to selectively override emergency video should not be made available to the viewer (i.e., emergency video should be "on top of" any other video, even when the underlying video is the replacement video according to the invention). Likewise, it may be preferable that the default condition is that closed-captioned video is on top of the other video, but given that consumers do not always understand how to select/deselect closed captioning, a manufacturer might choose to have replacement video on top of the closed captioning by default. The choice of which video (emergency, closed-captioning, replacement, etc.) takes precedence in terms of layering (i.e., "top layer", "next layer","bottom layer") may be implemented within the on-screen display subsystem of a TV set.

In other embodiments, closed captioning and/or emergency information may be carried as digital data within the transport streams (MPEG or other), as opposed to analog encoded digital data carried within the vertical blanking intervals (VBIs) of analog television signals. In such embodiments, if replacement video is selected to overlay closed-captioned and/or emergency video, the implementation may in fact function to disable the closed captioning and/or emergency video from being generated by the on-screen display subsystem in the first instance, as opposed to overlaying it with analog replacement video just before the display. This may involve replacing the digital data in the MPEG transport stream or at later points in the MPEG stream decoding process with data and/or instructions that cause the closed captioning and/or emergency video not to be generated as analog video for display in the first instance.

In general, nothing in the above disclosure should be construed to limit the implementation of replacing portions of video to analog means. The invention also foresees implementations that prevent the generation of annoying video in the first instance, as described above for the case of closed captioning and/or emergency information. For example, if logos, scoreboards or the like are specified to be generated by digital data within digital video bit streams, then the invention includes the means to cause the logos, scoreboards, etc. not to be generated by replacing portions of data or instructions in the digital bit streams that would otherwise cause them to be generated by a digital receiver.

Although the invention is described in terms of particular embodiments, it is to be understood that the embodiments are merely illustrative of an application of the principles of the invention. Numerous modifications may be made and other arrangements may be devised without departing from the spirit and scope of the invention as defined in the appended claims.

What is claimed is:

1. A system for modifying video images, said system comprising:
    a processing apparatus for displaying a video signal as a received image on a screen, said image including a first portion including undesirable content; and
    a control device in communication with said processing apparatus;
    a blocking element including a detector for detecting said first portion and an image generator generating an obstructing image;
    wherein said processing apparatus, said blocking element and said control device cooperate to replace said first portion of said received image on the screen with said obstructing image to obstruct said undesirable content in said received image;
    wherein said obstructing image is a dynamic image that changes in accordance with a parameter associated with said received image.

2. The system of claim 1 wherein said first portion is obstructed with a preselected image.

3. The system of claim 1 wherein said first portion includes alphanumeric characters.

4. The system of claim 1 wherein said obstructing image is a static image.

5. The system of claim 1 wherein said first portion is one of a text and a logo.

6. The system of claim 1 wherein said first portion includes a scrolling text.

* * * * *